(12) United States Patent
Bozic

(10) Patent No.: US 10,286,467 B2
(45) Date of Patent: May 14, 2019

(54) TOOL DEVICE

(75) Inventor: Milan Bozic, Solothurn (CH)

(73) Assignee: Robert Bosch GmbH, Stuttgart (DE)

( * ) Notice: Subject to any disclaimer, the term of this patent is extended or adjusted under 35 U.S.C. 154(b) by 1349 days.

(21) Appl. No.: 13/389,684

(22) PCT Filed: Jun. 23, 2010

(86) PCT No.: PCT/EP2010/058863
§ 371 (c)(1),
(2), (4) Date: Apr. 19, 2012

(87) PCT Pub. No.: WO2011/018266
PCT Pub. Date: Feb. 17, 2011

(65) Prior Publication Data
US 2012/0192439 A1  Aug. 2, 2012

(30) Foreign Application Priority Data
Aug. 12, 2009  (DE) .................. 10 2009 028 483

(51) Int. Cl.
*B23D 61/12* (2006.01)

(52) U.S. Cl.
CPC ......... *B23D 61/123* (2013.01); *Y10T 83/9454* (2015.04)

(58) Field of Classification Search
CPC .... B23D 61/12; B23D 61/123; B23D 61/128; B23D 61/006; B23D 61/121; B23D 51/10; Y10T 83/9454
USPC .................... 30/166.3, 355, 392; D8/20, 19; 83/835–855, 697
See application file for complete search history.

(56) References Cited

U.S. PATENT DOCUMENTS

| 3,357,462 | A | * | 12/1967 | Craven | ................ | B23D 61/128 76/112 |
| 3,477,479 | A | * | 11/1969 | Doty | .................... | B23D 61/123 174/102 R |
| 2004/0040425 | A1 | * | 3/2004 | Peyerl | .................. | B23D 49/162 83/56 |
| 2006/0005402 | A1 | * | 1/2006 | Nottingham | ........... | B23D 49/11 30/392 |

FOREIGN PATENT DOCUMENTS

| CN | 1429680 A | 7/2003 | |
| DE | 19521247 A1 * | 12/1996 | ............. D23D 49/16 |
| DE | 296 13 157 U1 | 11/1997 | |
| DE | 20 2004 017 351 * | 3/2003 | |
| DE | 20 2004 017 351 U1 | 3/2006 | |

(Continued)

OTHER PUBLICATIONS

GB 1 406 281 published Sep. 17, 1975 to Wolf Electric Tools Ltd.*
(Continued)

*Primary Examiner* — Evan H MacFarlane
(74) *Attorney, Agent, or Firm* — Maginot, Moore & Beck LLP

(57) ABSTRACT

A tool has at least one point, at least one working edge, at least one edge, which connects to the point and is located opposite of the working edge and which has at least one first edge region that is straight and forms an inclination angle between 0° and 2.5° with the working edge. The edge has a second edge region, which has a different inclination than the first edge region.

18 Claims, 4 Drawing Sheets

(56) References Cited

FOREIGN PATENT DOCUMENTS

GB      1 406 281    *   9/1975
GB      1 406 281 A    9/1975

OTHER PUBLICATIONS

DE 20 2004 017 351 published Mar. 16, 2003 to Wilh Putsch GmbH & Co. KG.*
International Search Report corresponding to PCT Application No. PCT/EP2010/058863, dated Sep. 30, 2010 (German and English language document) (5 pages).

* cited by examiner

TOOL DEVICE

This application is a 35 U.S.C. § 371 National Stage Application of PCT/EP2010/058863, filed on Jun. 23, 2010, which claims the benefit of priority to Application Serial No. DE 10 2009 028 483.4, filed on Aug. 12, 2009 Germany, the disclosures of which are incorporated herein by reference in their entirety.

BACKGROUND

The present disclosure relates to a tool device.

DE 20 2004 017 351 U1 has already disclosed a tool having a tip, a working edge and an edge which adjoins the tip and is located opposite the working edge and which has at least one first edge region, which is straight and includes an angle of inclination of between 0° and 2.5° with the working edge. Furthermore, the tool has a fastening element, which is provided for fastening to a tool holder of a machine tool. The machine tool comprises a roller, which rolls over a roller bearing edge region of the tool during an operating process. The roller bearing edge region is part of a coherent edge region, which is located opposite the working edge and which, proceeding from a first end point of the edge region which is at a shorter distance from the fastening element than a second end point of the edge region, has an inclination which is aligned in comparison with all other points of the edge region at each point in a path to the second end point and which is directed either away from or toward the working edge.

SUMMARY

The disclosure relates a tool having at least one tip, at least one working edge and at least one edge which adjoins the tip and is located opposite the working edge and which has at least one first edge region, which is straight and includes an angle of inclination of between 0° and 2.5° with the working edge.

It is proposed that the edge have a second edge region which has a different inclination than the first edge region. A "working edge" of the tool is intended to mean in particular an edge of the tool which is provided for making contact with workpieces and for machining the workpieces and which preferably has workpiece-machining formations and particularly preferably saw teeth, where it is preferable for material to be removed from the workpieces during the contact and it is particularly preferable for at least part of the workpiece to be cut off. A "tip" of the tool is intended to mean in particular a partial region of the tool which adjoins the working edge and which forms an end of the tool which is preferably an end of the tool with respect to a longitudinal direction of the tool and which is located with particular preference opposite a fastening end of the tool. In this case, the partial region extends along a main direction of extent of the tool preferably over at most forty percent, with preference over at most twenty-five percent and particularly preferably over at most ten percent of a maximum length of the extent of the tool. A "fastening end" of the tool is intended to mean in particular an end of the tool which has a fastening element of the tool which is provided for fastening the tool to a tool holder of a machine tool. An "edge region" is intended to mean in particular part of an edge. The feature whereby the edge "is located opposite" the working edge is intended to mean in particular that the edge is arranged between two planes which each have an end point of the edge and which have only surface extent directions which are perpendicular to a longitudinal direction of the working edge. The feature whereby "a straight edge region includes an angle of inclination with the working edge" is intended to mean in particular that an extension of the straight edge region and an extension of a rectilinear connection of points which correspond to one another and preferably of tips of certain workpiece-machining formations of the working edge, which, compared with other workpiece-machining formations of the working edge, have a maximum size and which are preferably formed by saw teeth, include the angle of inclination. The feature whereby "the second edge region has a different inclination than the first edge region" is intended to mean in particular that the second edge region is free of straight edge portions which include the same angle of inclination with the working edge as the first edge region. With a configuration according to the disclosure, it is possible to achieve high-quality usability. In particular, in a workpiece-machining process in which use is made of the tool, it is possible to achieve convenient and in particular largely vibration-free handling. Furthermore, it is possible in particular to achieve high-quality machinability of the workpiece and a frazzling-free state of a machining region of the workpiece which has been machined using the tool.

Furthermore, it is proposed that the angle of inclination be between 0° and 2°. As a result, it is possible to achieve particularly high-quality usability, and in particular efficient machining of workpieces. In addition, in a case where the working edge has saw teeth, it is possible to avoid slipping of the saw teeth during a working stroke in the case of a multiplicity of various workpieces and in particular in the case of workpieces made of metal, and to prevent the breakage of saw teeth.

It is preferable for the angle of inclination to be about 1°. The feature whereby "the angle of inclination is about 1°" is intended to mean in particular that the angle of inclination differs from 1° by at most 50%, preferably by at most 30%, with preference by at most 10% and particularly preferably by at most 5%. It is thereby possible to achieve efficient usability. In particular, it is possible to achieve a particularly high degree of material removal when machining a workpiece.

The second edge region is advantageously substantially parallel in relation to the working edge. The feature whereby an "edge region is substantially parallel to the working edge" is intended to mean in particular that the edge region is substantially rectilinear and preferably completely rectilinear and an extension of the edge region is either parallel to the working edge or includes at least an acute angle with the working edge which is at most 20°, preferably at most 7° and particularly preferably at most 3°. It is thereby possible to achieve convenient usability. In particular, it is possible to achieve a small degree of vibrations when using the tool by means of a machine tool.

Furthermore, it is proposed that the second edge region adjoin the tip. It is thereby possible to achieve a compact design. In particular, it is possible to achieve a small maximum length of the extent of the tool perpendicular to the working edge.

It is preferable for the edge to have at least one third edge region, which is arranged at a distance from the second edge region. It is thereby possible to achieve high-quality usability. In particular, it is possible to achieve usability with low wear. Furthermore, it is possible in particular for a guide roller of a machine tool for guiding the tool during an operating process in a state in which the tool is held in a tool holder of the machine tool and in which the tool is not being used to bear without pressure on the tool, as a result of which it is possible to achieve low loading of the guide roller and of a bearing unit for mounting the guide roller.

Furthermore, it is proposed that the third edge region be substantially parallel in relation to the working edge. It is thereby possible to achieve flexible usability.

In a preferred embodiment of the disclosure, a distance between the edge and the working edge is at most about 10 mm. The feature whereby a "distance between the edge and the working edge is at most 10 mm" is intended to mean in particular that a maximum distance between a point of the edge and the working edge is at most 10 mm. A "distance" between a first point and the working edge is intended to mean in particular the smallest distance of that number of distances between points of the working edge and the first point. The feature whereby "the distance is about 10 mm" is intended to mean in particular that the distance differs from 10 mm at most by 10%, preferably by 4% and particularly preferably by at most 2%. It is thereby possible to achieve a cost-effective design. In particular, it is possible to produce the tool from a blank which is designed and can be produced at low cost.

It is preferable for the tool to have at least one fastening means having at least one edge portion which is at the same perpendicular distance from an extension of the working edge as at least one point of the edge. "A perpendicular distance between a point and an extension of the working edge" is intended to mean in particular a length of a section which connects the point to the extension of the working edge and which is perpendicular to the extension of the working edge. "A perpendicular distance between the edge portion and an extension of the working edge" is intended to mean in particular a maximum and/or a minimum perpendicular distance between points of the edge portion and the extension of the working edge. It is thereby possible to achieve flexible usability. In particular, it is possible to achieve a combined use of the tool with specific machine tools.

The second edge region advantageously has a different inclination than each partial region of the tip. It is thereby possible to achieve a stable design.

Furthermore proposed is a tool device having at least one tool holding unit, which has at least one roller, having at least one tool, which has at least one fastening element, which is provided for fastening to the tool holding unit, at least one working edge and at least one coherent edge region, which is located opposite the working edge and which, proceeding from a first end point of the edge region which is at a shorter distance from the fastening element than a second end point of the edge region, has an inclination which is aligned in comparison with all other points of the edge region at each point in a path to the second end point and which is directed either away from or toward the working edge, wherein the edge region has a roller bearing edge region, which is provided for the roller to roll over during at least one operating process, and wherein the overall length of the edge region is at most thirty percent greater than the overall length of the roller bearing edge region. With a configuration according to the disclosure, it is possible to achieve high-quality usability. The overall length of the edge region is preferably at most twenty, particularly preferably at most five percent greater than the overall length of the roller bearing edge region, as a result of which vibrations which occur during an operating process are particularly small.

BRIEF DESCRIPTION OF THE DRAWINGS

Further advantages will become apparent from the following description of the drawings. The drawings show exemplary embodiments of the disclosure. The drawings, the description and the claims contain numerous features in combination. A person skilled in the art will also expediently consider the features individually and combine them to form meaningful further combinations.

DETAILED DESCRIPTION

Figure 1:
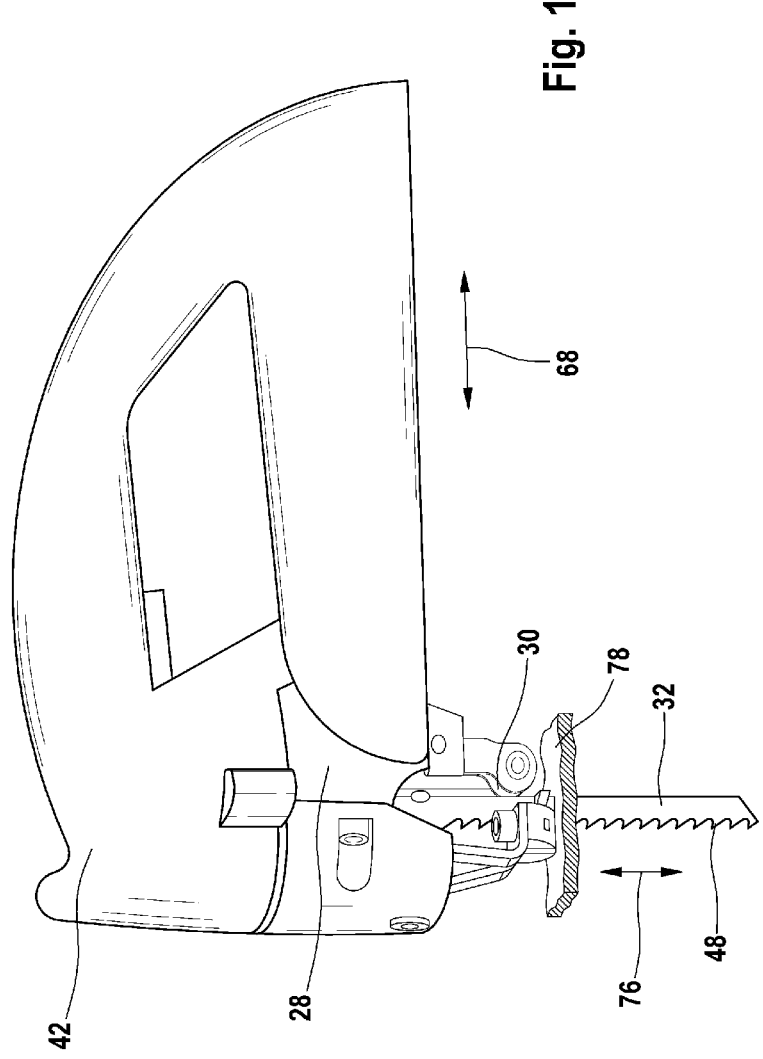
FIG. 1 shows a schematic partial section of a system having a machine tool and a tool.
Figure 2:
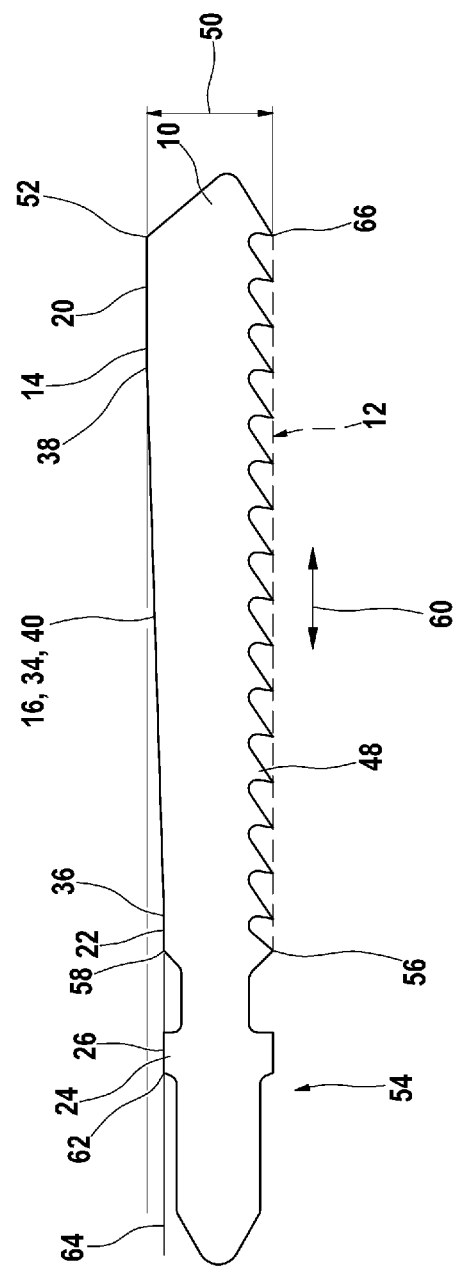
FIG. 2 is a schematic side view of the tool.
Figure 3:
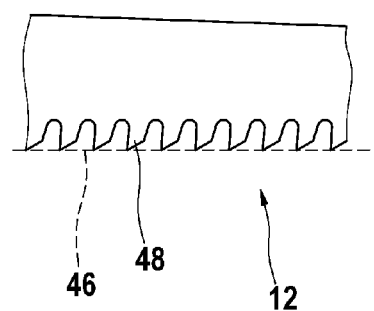
FIG. 3 is a schematic detailed view of a working edge of the tool.
Figure 4:
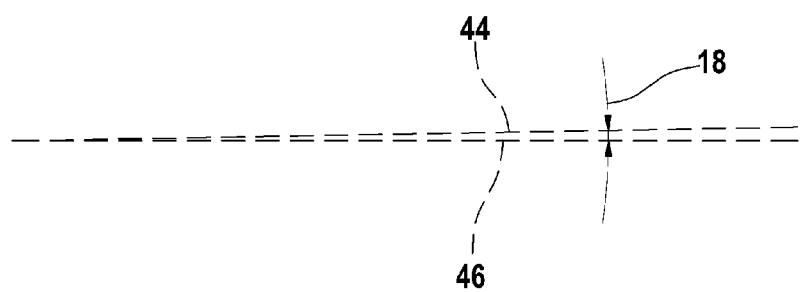
FIG. 4 is a view of an extension of the working edge and of an extension of an edge region of the tool.

FIG. 1 shows a system having a machine tool 42, which is in the form of a jigsaw, and having a tool 32, which is formed by a jigsaw blade having a tip 10 and a working edge 12 (FIG. 2). Furthermore, the tool 32 has an edge 14 which directly adjoins the tip 10 and is located opposite the working edge 12. The edge 14 has a first edge region 16, which is straight and includes an angle of inclination 18 of 1° with the working edge 12. A rectilinear extension of the straight edge region 16, which forms a straight line 44, and a rectilinear extension of straight connection pieces of saw teeth 48 of the working edge 12, which forms a straight line 46, include the angle of inclination 18 (FIGS. 2 to 4).

The edge 14 has a second edge region 20 which has a different inclination than the first edge region 16 and each partial region of the tip 10. The second edge region 20 begins at one of the end points 36, 38 of the first edge region 16. The working edge 12—and in particular the straight line 46—is parallel to the straight edge region 16. Furthermore, the second edge region 20 directly adjoins the tip 10.

Furthermore, the edge 14 has a third edge region 22, which directly adjoins the first edge region 16. The third edge region 22 is arranged at a distance from the second edge region 20 and has a straight form. In addition, the third edge region 22 is parallel to the working edge 12 and in particular parallel to the straight line 46.

The maximum distance 50 between the edge 14 and the working edge 12, to be precise the straight line 46, is 10 mm. A point 52 of the edge 14, which is at the greatest distance from the straight line 46—and therefore from the working edge 12—compared with all other points of the edge 14, is an end point of an end of the edge 14 which directly adjoins the tip 10. The point 52 is located opposite an end point 66 of the working edge 12, at which the working edge 12 adjoins the tip 10.

Proceeding from an end 56 of the working edge 12 and an end 58 of the third edge region 22, which are remote from the tip 10, the tool 32 tapers in a direction away from the tip 10 along a longitudinal direction 60 of the tool 32.

At an end region 54 of the tool 32 which is located opposite an end of the tool 32 which is formed by the tip 10, the tool 32 has a fastening element 24, which is formed by two elevations 62 (FIG. 2). One of the elevations 62 has a straight edge portion 26. An extension of the straight edge portion 26 forms a straight line 64, which is identical to a straight line formed by an extension of the third straight edge region 22.

The system shown in FIG. 1 is formed by a tool device which has the machine tool 42 and the tool 32. The machine tool has a tool holding unit 28 having a roller 30. The fastening element 24 fastens the tool 32 to the tool holding unit 28. The first edge region 16 is identical to a coherent edge region 34. Furthermore, the coherent edge region 34 is identical to a roller bearing edge region 40. The roller bearing edge region 40 is precisely that part of the edge 14 over which the roller 30 rolls during an operating process. Other parts of the edge 14, which differ from the first edge region 16, remain untouched by the roller 30 during operation of the machine tool 42.

Figure 5:
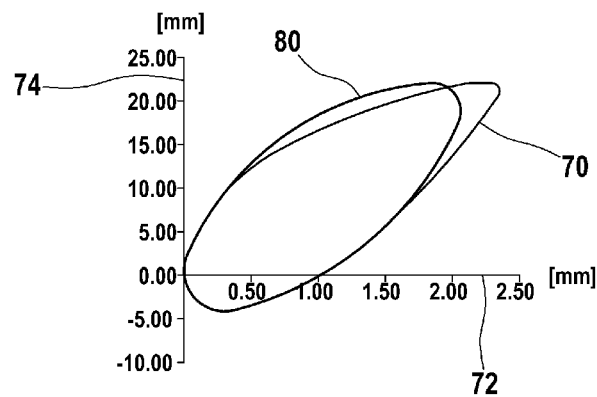
FIG. 5 is a graph plotting paths of movement of the tool.

The machine tool 42 has an actuator system (not shown) which, during an operating process, moves the roller 30 along a longitudinal direction 68 of the machine tool 42, which is in the form of a jigsaw. On account of the formation of the first edge region 16 and the influence of the actuator system, the tool 32 describes a closed path 70 during an operating process (FIG. 5). A position of the tool 32 with respect to the longitudinal direction 68 during an operating process is plotted on an abscissa 72 of a graph shown in FIG. 5. A position of the tool 32 with respect to a direction 76 which is directed perpendicular to a guide shoe 78 of the machine tool 42 is plotted on an ordinate 74 of the graph. A second path 80 shown in the graph shows a path of movement of a tool (not shown) which has a completely straight edge 14. In the case of both paths 70, 80, a left upper part of the paths represents a working stroke during which material is removed from a workpiece. A comparison of the paths 70 and 80 shows that a geometry of the first edge region 16 has the effect that the working stroke of the path is more prolonged than the working stroke of the path 80. In particular, it is therefore possible to achieve greater material removal and more efficient sawing with the working stroke of the path 70.

Figure 6:
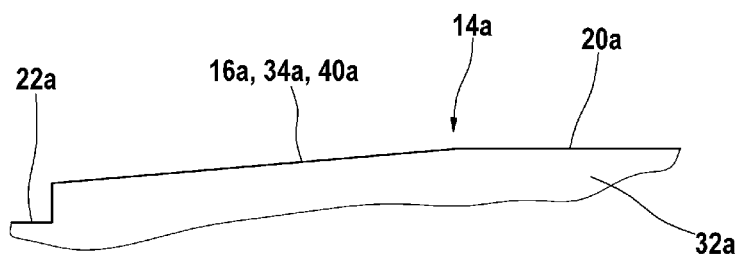
FIG. 6 shows part of an alternative exemplary embodiment of a tool.
Figure 7:
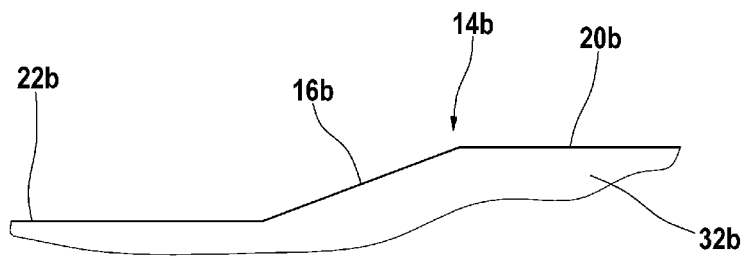
FIG. 7 shows part of a further alternative exemplary embodiment of a tool.

FIGS. 6 and 7 show alternative exemplary embodiments. Components, features and functions which remain substantially the same are in principle designated by the same reference symbols. To distinguish between the exemplary embodiments, however, the letters "a" and "b" have been added to the reference symbols of the exemplary embodiments in FIGS. 6 and 7. The description which follows is limited substantially to the differences with respect to the exemplary embodiment in FIGS. 1 to 5, where reference can be made to the description of the exemplary embodiment in FIGS. 1 to 5 concerning components, features and functions which remain the same.

FIG. 6 shows part of an alternative exemplary embodiment of a tool 32a. A first edge region 16a of the tool 32a includes an angle of inclination of 0.5° with a working edge 12 of the tool 32a.

FIG. 6 shows part of a further alternative exemplary embodiment of a tool 32b. A first edge region 16b of the tool 32b includes an angle of inclination of 2° with a working edge 12 of the tool 32b.

The invention claimed is:

1. A tool comprising:
a tip,
an end region defining a fastening element for fastening the tool to a tool holding unit, and
a working portion defined between said tip and said end region and including a linear working edge and a second edge coextensive with the working edge and located directly opposite the working edge,
said working edge defining saw teeth and being linear along an entire length of said working edge from said tip to said end region, said working edge defining a working stroke direction in which said tool is moved so that material is removed from a workpiece by said saw teeth, said working stroke direction extending from said tip to said fastening element, and
said second edge adjoining the tip and including:
a first edge region which is straight and includes a first angle of inclination away from said working edge of between 0° and 2.5° with the working edge;
a second edge region between the first edge region and the tip which has a second angle of inclination different from said first angle of inclination relative to said working edge; and
a third edge region arranged adjacent the first edge region at a distance from the second edge region and which has a third angle of inclination different from said first angle inclination relative to said working edge,
wherein respective entire lengths of said first, second and third edge regions are all located directly opposite the working edge and all combine to form an entire length of said second edge, and
wherein a distance between said working edge and said second edge increases in a direction opposite said working stroke direction from a minimum distance at said third region to a maximum distance at said second region and increases continuously along said first edge region from said third edge region to said second edge region.

2. The tool as claimed in claim 1, wherein the first angle of inclination is between 0° and 2°.

3. The tool as claimed in claim 2, wherein the first angle of inclination is about 1°.

4. The tool as claimed in claim 1, wherein the second edge region is parallel in relation to the working edge.

5. The tool as claimed in claim 1, wherein the second edge region adjoins the tip.

6. The tool as claimed in claim 1, wherein the entire length of the second edge is at most thirty percent greater than the entire length of the first edge region.

7. The tool as claimed in claim 1, wherein the third edge region is parallel in relation to the working edge.

8. The tool as claimed in claim 1, wherein said maximum distance between the second edge and the working edge is 10 mm.

9. The tool as claimed in claim 1, wherein the fastening element has at least one edge portion which is at a perpendicular distance that is the same perpendicular distance as at least one point of the second edge, the perpendicular distance measured with reference to an extension of the working edge.

10. The tool as claimed in claim 1, wherein the tip includes at least one partial region between the working edge and the second edge, and wherein the second edge region has a different angle of inclination relative to said working edge than the at least one partial region of the tip.

11. A system comprising:
a machine tool having a tool holding unit; and
a tool including:
a tip,
an end region defining a fastening element for fastening the tool to the tool holding unit,
a working portion defined between said tip and said end region and including a linear working edge and a second edge the working edge and located directly opposite the working edge,
said working edge defining saw teeth and being linear along an entire length of said working edge from said tip to said end region, said working edge defining a working stroke direction in which said tool is moved so that material is removed from a workpiece by said saw teeth, said working stroke direction extending from said tip to said fastening element, and said second edge adjoining the tip and including:

a first edge region which is straight and includes a first angle of inclination away from said working edge of between 0° and 2.5° with the working edge;

a second edge region between the first edge region and the tip which has a second angle of inclination different from said first angle of inclination relative to said working edge; and a third edge region arranged adjacent the first edge region at a distance from the second edge region and which has a third angle of inclination different from said first angle inclination relative to said working edge, wherein respective entire lengths of said first, second and third edge regions are all located directly opposite the working edge and all combine to form an entire length of said second edge, and wherein a distance between said working edge and said second edge increases in a direction opposite said working stroke direction from a minimum distance at said third region to a maximum distance at said second region and increases continuously along said first edge region from said third edge region to said second edge region.

12. A tool comprising:

a tip, an end region defining a fastening element for fastening the tool to a tool holding unit, and a working portion defined between said tip and said end region and including a linear working edge and a second edge the working edge and located directly opposite the working edge, said working edge defining saw teeth and being linear along an entire length of said working edge from said tip to said end region, said working edge defining a working stroke direction in which said tool is moved so that material is removed from a workpiece by said saw teeth, said working stroke direction extending from said tip to said fastening element, and said second edge adjoining the tip and including:

a first edge region which is straight and includes a first angle of inclination away from said working edge of between 0° and 2.5° with the working edge;

a second edge region between the first edge region and the tip which has a second angle of inclination different from said first angle of inclination relative to said working edge; and a third edge region arranged adjacent the first edge region at a distance from the second edge region and which has a third angle of inclination different from said first angle inclination relative to said working edge, wherein respective entire lengths of said first, second and third edge regions are all located directly opposite the working edge and all combine to form an entire length of said second edge, wherein the third edge region is parallel in relation to the working edge and directly adjoins the first edge region, and wherein a distance between said working edge and said second edge increases in a direction opposite said working stroke direction from a minimum distance at said third region to a maximum distance at said second region and increases continuously along said first edge region from said third edge region to said second edge region.

13. The tool as claimed in claim 12, wherein said maximum distance between the second edge and the working edge is 10 mm.

14. The tool as claimed in claim 12, wherein the first angle of inclination is between 0° and 2°.

15. The tool as claimed in claim 14, wherein the first angle of inclination is about 1°.

16. The tool as claimed in claim 12, wherein the entire length of the second edge is at most thirty percent greater than the entire length of the first edge region.

17. The tool as claimed in claim 12, wherein the fastening element has at least one edge portion which is at a perpendicular distance that is the same perpendicular distance as at least one point of the second edge, the perpendicular distance measured with reference to an extension of the working edge.

18. The tool as claimed in claim 12, wherein the tip includes at least one partial region between the working edge and the second edge, and wherein the second edge region has a different angle of inclination relative to said working edge than the at least one partial region of the tip.

* * * * *